United States Patent
Ma

(10) Patent No.: US 9,784,489 B2
(45) Date of Patent: Oct. 10, 2017

(54) AIR CONDITIONING SYSTEM WITH DISTILLED WATER PRODUCTION FROM AIR

(75) Inventor: Zidu Ma, Ellington, CT (US)

(73) Assignee: CARRIER CORPORATION, Farmington, CT (US)

(*) Notice: Subject to any disclaimer, the term of this patent is extended or adjusted under 35 U.S.C. 154(b) by 626 days.

(21) Appl. No.: 14/003,680

(22) PCT Filed: Mar. 16, 2012

(86) PCT No.: PCT/US2012/029400
§ 371 (c)(1),
(2), (4) Date: Sep. 6, 2013

(87) PCT Pub. No.: WO2012/125909
PCT Pub. Date: Sep. 20, 2012

(65) Prior Publication Data
US 2013/0340468 A1    Dec. 26, 2013

Related U.S. Application Data

(60) Provisional application No. 61/453,300, filed on Mar. 16, 2011.

(51) Int. Cl.
*F25D 21/00* (2006.01)
*F25D 17/06* (2006.01)
(Continued)

(52) U.S. Cl.
CPC ............ *F25B 43/00* (2013.01); *E03B 3/28* (2013.01); *F24F 3/1417* (2013.01)

(58) Field of Classification Search
CPC ........ B01D 61/38; B01D 61/04; B01D 61/06; B01D 61/10; B01D 61/16; B01D 61/20;
(Continued)

(56) References Cited

U.S. PATENT DOCUMENTS 2,535,008 A * 12/1950 Crawford ............ B01D 1/0082
159/4.1
3,404,537 A * 10/1968 Leonard, Jr. ............ C02F 1/16
159/DIG. 5
(Continued)

FOREIGN PATENT DOCUMENTS

CN       1295662 A      5/2001
CN       1323644 A      11/2001
(Continued)

OTHER PUBLICATIONS

Notification of Transmittal of the International Search Report and the Written Opinion of the International Searching Authority, or the Declaration; PCT/US2012/029400; Sep. 11, 2012.
(Continued)

*Primary Examiner* — Allen Flanigan
*Assistant Examiner* — Filip Zec
(74) *Attorney, Agent, or Firm* — Cantor Colburn LLP

(57) ABSTRACT

An air conditioning and water producing system includes a heat pumping unit and a membrane contactor in thermal communication with the heat pumping unit. The membrane contactor is configured such that a first brine flow is cooled by the heat pumping unit and diluted at the membrane contactor. A distiller is in thermal communication with the heat pumping unit and the membrane contactor such that a second brine flow is heated by the heat pumping unit and conveyed through the distiller. Thermal interaction between the second brine flow and the first brine flow flowing through the distiller extracts water from the second brine flow.

9 Claims, 1 Drawing Sheet

(51) Int. Cl.
| | |
|---|---|
| *F25B 15/00* | (2006.01) |
| *B01D 15/00* | (2006.01) |
| *C02F 1/44* | (2006.01) |
| *B01D 11/04* | (2006.01) |
| *C02F 1/26* | (2006.01) |
| *B01D 17/00* | (2006.01) |
| *F25B 43/00* | (2006.01) |
| *E03B 3/28* | (2006.01) |
| *F24F 3/14* | (2006.01) |

(58) Field of Classification Search
CPC ...... B01D 61/36; B01D 61/368; B01D 61/58; B01D 2311/04; B01D 2311/08; B01D 2311/103; B01D 2311/25; B01D 2311/2669; B01D 2311/2673; B01D 17/00; B01D 17/005; B01D 5/00; B01D 5/0057; B01D 5/006; B01D 5/0075; B01D 5/0078; B01D 5/009; F24F 3/1417; F25B 43/00
USPC ............. 210/640, 642, 643; 62/272, 476, 94
See application file for complete search history.

(56) References Cited

U.S. PATENT DOCUMENTS

| | | | | |
|---|---|---|---|---|
| 6,365,051 | B1* | 4/2002 | Bader | B01D 61/147 210/640 |
| 6,557,266 | B2* | 5/2003 | Griffin | F26B 21/06 34/168 |
| 6,656,361 | B1* | 12/2003 | Herron | B01D 63/10 210/175 |
| 7,823,396 | B2* | 11/2010 | Al-Mayahi | B01D 61/002 62/118 |
| 2006/0076294 | A1* | 4/2006 | Sirkar | B01D 61/364 210/640 |
| 2006/0144788 | A1 | 7/2006 | Cath et al. | |
| 2008/0276630 | A1 | 11/2008 | Lukitobudi | |
| 2009/0152199 | A1* | 6/2009 | Ma | B01D 3/06 210/640 |
| 2010/0051549 | A1* | 3/2010 | Ma | B01D 61/364 210/640 |
| 2010/0065496 | A1* | 3/2010 | Ma | B01D 61/364 210/637 |
| 2010/0072135 | A1* | 3/2010 | Hanemaaijer | B01D 1/0035 210/640 |
| 2011/0180383 | A1* | 7/2011 | Ma | B01D 61/364 203/22 |
| 2011/0180479 | A1* | 7/2011 | Cordatos | B01D 61/364 210/640 |
| 2011/0233137 | A1* | 9/2011 | Cath | B01D 61/002 210/644 |
| 2012/0067819 | A1* | 3/2012 | McGinnis | B01D 3/145 210/640 |
| 2012/0091061 | A1* | 4/2012 | Al-Jlil | B01D 61/002 210/640 |

FOREIGN PATENT DOCUMENTS

| | | |
|---|---|---|
| CN | 1392312 A | 1/2003 |
| CN | 2937894 Y | 8/2007 |
| CN | 101435608 A | 5/2009 |
| CN | 101435615 A | 5/2009 |
| CN | 101851946 A | 10/2010 |
| CN | 101939085 A | 1/2011 |
| CN | 201711096 U | 1/2011 |
| EP | 198001015081980 | 3/1980 |
| EP | 199502005211995 | 3/1995 |
| EP | 200801678752008 | 10/2008 |
| WO | WO2006IB019472006 | 3/2006 |
| WO | 2006129200 A2 | 12/2006 |

OTHER PUBLICATIONS

International Search Report, China; Application No. 201280013530.9; Mailing Date Aug. 3, 2015; 3 pages.

* cited by examiner

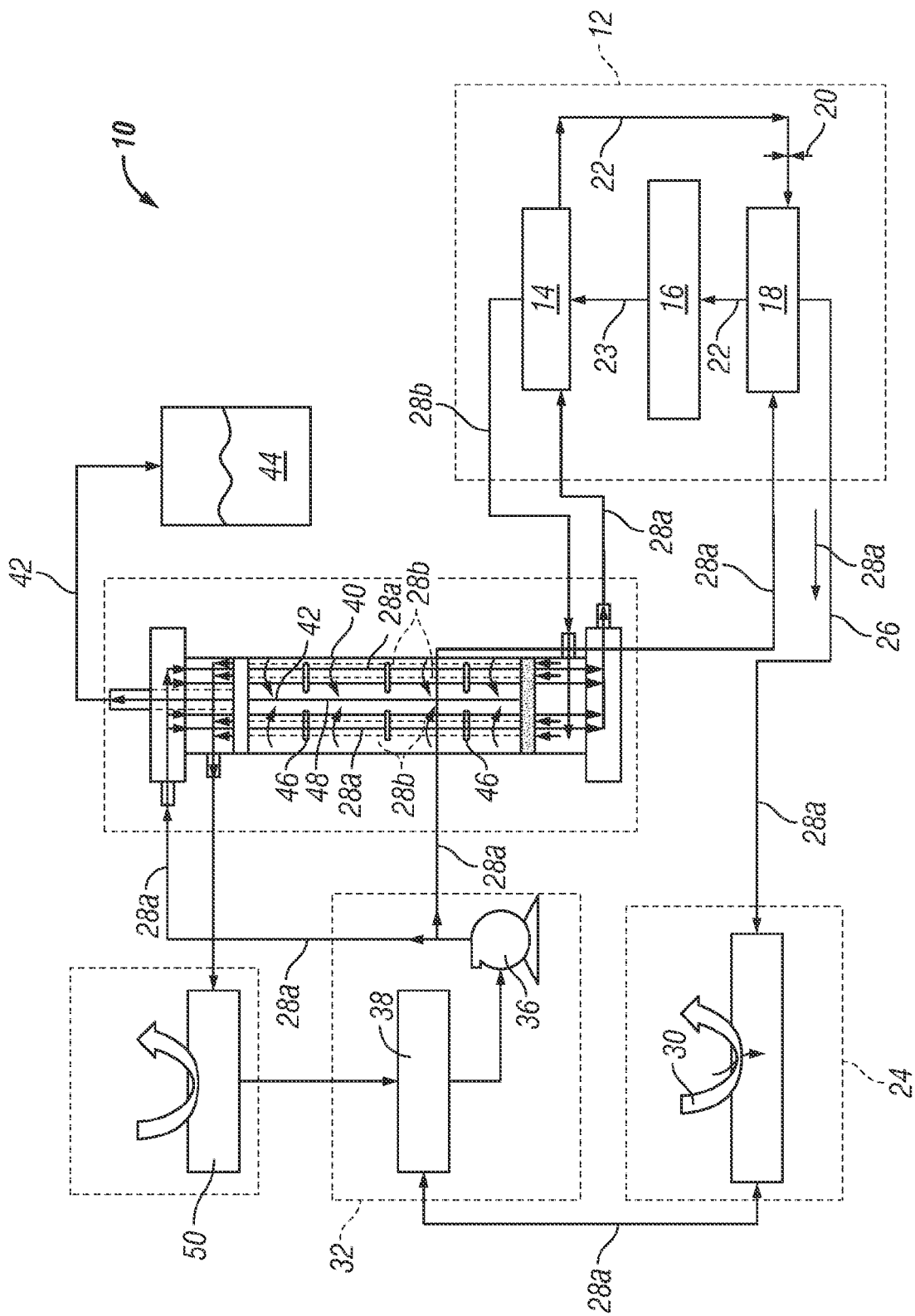

AIR CONDITIONING SYSTEM WITH DISTILLED WATER PRODUCTION FROM AIR

BACKGROUND OF THE INVENTION

The subject matter disclosed herein relates to air conditioning systems. More specifically, the subject disclosure relates to humidity control for air conditioning systems.

Heating, ventilation, air conditioning and refrigeration (HVAC&R) systems produce large quantities of heat which are rejected to the ambient environment, especially when the HVAC&R system is operated in cooling mode. The rejected heat represents an efficiency loss to the system. The art would well receive improvements to the HVAC&R system to productively utilize this otherwise rejected heat.

BRIEF DESCRIPTION OF THE INVENTION

According to one aspect of the invention, an air conditioning and water producing system includes a heat pumping unit and a membrane contactor in thermal communication with the heat pumping unit. The membrane contactor is configured such that a first brine flow is cooled by the heat pumping unit and diluted at the membrane contactor. A distiller is in thermal communication with the heat pumping unit and the membrane contactor such that a second brine flow is heated by the heat pumping unit and conveyed through the distiller. Thermal interaction between the second brine flow and the first brine flow flowing through the distiller extracts water from the second brine flow.

According to another aspect of the invention, a method of extraction of water from air includes cooling a first brine flow at a heat pumping unit and absorbing moisture into the first brine flow via an enthalpy exchange between the first brine flow and an airflow at a membrane contactor. A second brine flow is heated at the heat pump and the first brine flow and the second brine flow are conveyed into a distiller. Water is extracted from the second brine flow at the distiller.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The FIGURE is a schematic of an embodiment of an air conditioning system.

The detailed description explains embodiments of the invention, together with advantages and features, by way of example with reference to the drawings.

DETAILED DESCRIPTION OF THE INVENTION

Shown in the FIGURE is a schematic of an air conditioning system 10. The system 10 includes a heat pump unit 12. It is to be appreciated that while a heat pump 12 is shown in the FIGURE and described herein, it is merely exemplary and other types of air conditioning units such as chillers, absorption chillers and/or vapor compression chillers may be utilized in the system 10. The heat pump 12 includes a condenser 14, a compressor 16, an evaporator 18 and an expansion valve 20. A refrigerant pathway 22 circulates refrigerant through the condenser 14, compressor 16, evaporator 18 and expansion valve 20. An enthalpy exchanger, for example, a membrane contactor 24, is connected to the evaporator 18 via one or more evaporator outlet pathways 26 which transports a first flow of brine 28a from the evaporator 18 to the membrane contactor 24. The enthalpy exchanger is capable of transferring latent and sensible heat at the same time. The first brine flow 28a is cooled in the evaporator 18 via exchange of thermal energy with the refrigerant flowing through the evaporator 18. The first brine flow 28a flows through the membrane contactor 24 and absorbs thermal energy and moisture from a flow of process air 30, which may be outdoor air or air to be cooled in a building or other structure. Thus the first brine flow 28a is diluted (via the absorption of moisture) and warmed (by thermal energy exchange with the process air).

A brine system 32 is connected to the membrane contactor 24 via one or more diluted brine pathways. In some embodiments, the brine system 32 includes a brine pump 36 and a brine sump 38. The diluted first brine flow 28a is routed to the brine sump 38 and pumped out of the brine system 32 by the brine pump 36. The first brine flow 28a from the brine pump 36 is divided into at least two portions, with a first portion 28a conveyed to the evaporator 18 and flowed therethrough and then to the membrane contactor 24 as described above. The second portion 28a is conveyed to a distiller, for example, a liquid gap membrane distiller 40, which can be driven by low temperature heat from the condenser 14. The second portion 28a flows through the distiller 30 and picks up the condensing heat from the distillation process.

A second brine flow 28b is circulated through the condenser 14 and is further heated via a thermal energy exchange with the flow of refrigerant through the condenser 14. This heated second brine flow 28b is routed to the distiller 40 and flowed therethrough. With the two separate brine flows 28a and 28b flowing through the distiller 40, the temperature difference between the second brine flow 28b and the relatively cooler first brine flow 28a causes water vapor transfer from warmer brine 28b across hydrophobic porous membranes (46) and condense at the surface of solid tubes (48) and becomes distilled water 42. The distilled water 42 may be collected in a storage tank 44.

The first brine flow 28a, pre-heated by the condensing heat from the distilled water 42, exits the distiller 40 and is circulated through the condenser 14 and back to the distiller 40 as the second brine flow 28b to enter into the porous membrane side 46 of the distiller 40. The second brine flow 28b, having water distilled from it, is conveyed from the exit of the membrane 46 side of distiller 40 to and across a heat exchanger, for example, a fan coil 50, where heat is rejected from the second brine flow 28b to the ambient environment, which may be outside air or room exhaust. The second brine flow 28b is then routed to the brine sump 38 for recirculation through the system 10.

The system 10 described herein collects moisture from air and cools the air, thereby reducing humidity and temperature if so desired and utilizes heat from condenser 14 to distill water from a brine 28 circulated through the system 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An air conditioning and water producing system comprising:
   a heat pumping unit including a condenser and an evaporator;
   a membrane contactor in thermal communication with the heat pumping unit configured such that a first brine flow is cooled by the evaporator of the heat pumping unit and diluted at the membrane contactor via absorption of moisture from a flow of process air;
   a distiller in thermal communication with the heat pumping unit and the membrane contactor such that a second brine flow is flowed a first time through the distiller, heated by the condenser of the heat pumping unit and conveyed a second time through the distiller, thermal interaction between the second brine flow conveyed a second time through the distiller and the first time through the distiller extracts water from the second brine flow; and
   a brine sump to which both the first brine flow and the second brine flow are conveyed.

2. The system of claim 1, further comprising a heat exchanger to reject heat from the second brine flow after distillation.

3. The system of claim 1, further comprising a brine pump to pump at least a portion of the first brine flow to the heat pumping unit.

4. The system of claim 1, wherein the heat pumping unit is a vapor-compression heat pump or a sorption heat pump.

5. The system of claim 4, wherein the membrane contactor is thermally connected to an evaporator of the heat pumping unit via the first brine flow.

6. The system of claim 4, wherein the distiller is thermally connected to a condenser of the heat pumping unit via the second brine flow.

7. The system of claim 1, wherein the distiller is a liquid gap membrane distiller.

8. The system of claim 1, wherein the membrane contactor is configured to cool the flow of process air via the first brine flow.

9. The system of claim 1, further comprising a tank for storage of the distilled water.

* * * * *